United States Patent
Engel et al.

[15] 3,689,801
[45] Sept. 5, 1972

[54] CIRCUIT BREAKER INCLUDING IMPROVED CURRENT AUCTIONEERING CIRCUIT

[72] Inventors: Joseph C. Engel; Robert T. Elms, both of Monroeville, Pa.

[73] Assignee: Westinghouse Electric Corporation, Pittsburgh, Pa.

[22] Filed: May 7, 1970

[21] Appl. No.: 35,517

[52] U.S. Cl............317/26, 317/27 R, 317/46, 317/52, 307/63, 307/77
[51] Int. Cl..................................H02h 7/26
[58] Field of Search ...317/26, 27, 46, 52, 31, 36 TD, 317/29 R; 307/63, 77, 80, 44; 328/150

[56] References Cited

UNITED STATES PATENTS

3,296,495  1/1967  Paddison..................317/29 R
3,543,094  11/1970  South......................317/36 TD
2,608,606  8/1952  Sonnemann..............317/26 X Primary Examiner—J. D. Miller
Assistant Examiner—Harvey Fendelman
Attorney—A. T. Stratton and Clement L. McHale

[57] ABSTRACT

A circuit breaker including a current auctioneering circuit for obtaining a unidirectional output current which is substantially equal to the unidirectional output current of only one of a plurality of substantially constant, unidirectional current sources each having a pair of output terminals comprising means for connecting the output terminals of the current sources in series circuit relation between a pair of overall output terminals and rectifier means connected to the output terminals of each current source.

6 Claims, 5 Drawing Figures

INVENTOR
Joseph C. Engel &
Robert T. Elms

FIG. 5

CIRCUIT BREAKER INCLUDING IMPROVED CURRENT AUCTIONEERING CIRCUIT

CROSS REFERENCES TO RELATED APPLICATIONS

Certain inventions disclosed in the present application are related to inventions which are disclosed and claimed in copending applications Ser. No. 765,584 filed Oct. 7, 1968 by J. D. Watson, F. T. Thompson and F. O. Johnson, Ser. No. 765,583 filed Oct. 7, 1968 by J. D. Watson, Ser. No. 765,582 filed Oct. 7, 1968 by J. D. Watson ( now abandoned), a continuation of which was filed June 18, 1970 as copending application Ser. No. 47,624 and which issued June 29, 1971 as U.S. Pat. No. 3,590,326, Ser. No. 765,552 filed Oct. 7, 1968 by W. H. South and J. H. Taylor, which issued Nov. 24, 1970 as U.S. Pat. No. 3,543,094, Ser. No. 35,531 filed concurrently by J. C. Engel and R. T. Elms, Ser. No. 35,409 filed concurrently by J. T. Wilson, Ser. No. 35,516 filed concurrently by J. C. Engel and J. T. Wilson and Ser. No. 35,382 filed concurrently by A. J. Hendry and J. T. Wilson which are all assigned to the same assignee as the present application.

BACKGROUND OF THE INVENTION

This invention relates to electric auctioneering circuits and it has particular relation to current auctioneering circuits.

In certain types of electrical control apparatus, such as static overcurrent protective devices of the type disclosed in copending application Ser. No. 35,531 previously mentioned, it is sometimes necessary to provide an auctioneering circuit in which the output is responsive to or varies with only the largest or the smallest of a plurality of input signals or currents. In known auctioneering circuits, such as disclosed in copending application Ser. No. 765,584, previously mentioned, the comparison of the input signals is usually accomplished on the basis of voltage rather than current. Where input currents are to be compared, the currents may be converted to unidirectional voltages which are then compared to obtain an output signal which varies with only one of the input currents. The latter method of comparing the voltages which correspond to a plurality of input currents has certain disadvantages. For example, if a plurality of input currents are converted to voltages by applying the individual currents to corresponding resistors and then comparing the voltages across the resistors, the accuracy of the output signal depends on how precisely the values of the resistors match and to what degree the values of the different resistors change as the environmental temperature changes. Where the auctioneering of input currents is accomplished on a current basis as in U.S. Pat. No. 3,001,123 which issued Sept. 19, 1961 to J. F. Reuther and J. T. Carleton and which is assigned to the same assignee as the present application, the control apparatus may be relatively complicated in nature, such as requiring the use of magnetic amplifiers, or the number of currents that can be compared in a single control stage may be limited.

SUMMARY OF THE INVENTION

In accordance with the invention, a current auctioneering circuit is provided for obtaining a unidirectional output current which is substantially equal to the output current of only one of a plurality of substantially constant unidirectional current sources each having a pair of output terminals. Means is provided for connecting the output terminals of the respective current sources in series circuit relation with the output currents of said sources arranged to flow in the same direction. The series circuit thus formed is connected to a pair of overall output terminals of the auctioneering circuit. A rectifier means, more specifically a diode, is connected in parallel with or across the output terminals of each of said current sources with all of the rectifier means being poled in the same direction which may be in a direction to permit the output currents of the respective current sources in flow in parallel with the output terminals of the other current sources except in the rectifier means associated with one of the current sources. In the latter case, the output current of the auctioneering circuit is substantially equal to the instantaneously largest or highest of the output currents of the plurality of current sources.

In a second embodiment of the invention, the rectifier means associated with each current source is reversely poled with respect to the direction of the output currents of the other current sources. In this embodiment, the output current of the auctioneering circuit is substantially equal to only the instantaneously smallest or lowest of the output currents of the plurality of current sources for output voltage less than two diode voltage drops.

In a third embodiment of the invention, a current auctioneering circuit is provided for obtaining a unidirectional output current which is substantially proportional to or varies with only one of the output currents of a plurality of substantially constant alternating current sources each having a pair of output terminals comprising a full wave, bridge type rectifier circuit associated with each alternating current source and including a plurality of diodes connected to the output terminals of the associated alternating current source and a pair of unidirectional current output terminals for converting the output current of each alternating current source to a substantially constant unidirectional output current. Means is provided for connecting the unidirectional current output terminals of all of the bridge circuits in series circuit relation with the unidirectional output currents arranged to flow in the same direction, said series circuit being connected to a pair of overall output terminals of the auctioneering circuit. In this embodiment, the diodes of each bridge rectifier circuit associated with one of the alternating current sources during at least certain operating conditions form a current carrying path between the associated unidirectional output terminals of the rectifier circuit for a portion of the unidirectional output current from at least one of the other alternating current sources.

Where desired, the unidirectional output current of each of the above auctioneering circuits may be applied to an output resistor which is connected across the overall output terminals of the auctioneering circuit to develop a unidirectional output voltage which varies with substantially only one of the output currents of the associated current sources.

In addition, the disclosed auctioneering circuit may be embodied in a static overcurrent protective circuit associated with a circuit interrupter to actuate the tripping of the circuit interrupter or circuit breaker upon the occurrence of certain overcurrent operating conditions as disclosed in copending application Ser. No. 35,531, previously mentioned.

BRIEF DESCRIPTION OF THE DRAWINGS

For a better understanding of the invention, reference may be had to the preferred embodiment, exemplary of the invention, shown in the accompanying drawings in which.

DESCRIPTION OF THE PREFERRED EMBODIMENTS

Figure 1:
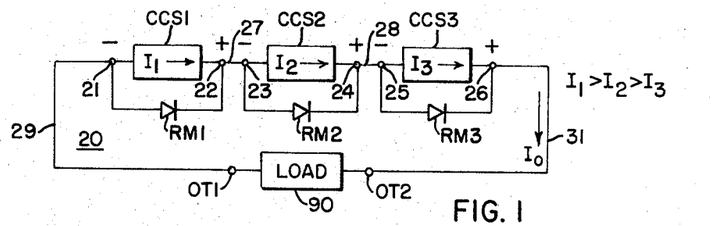
FIG. 1 is a schematic diagram illustrating a first embodiment of the invention.

Referring now to the drawings and FIG. 1 in particular, there is illustrated a current auctioneering circuit 20 for obtaining a unidirectional output current which is substantially equal to the output current of only one of a plurality of substantially constant unidirectional current sources CCS1, CCS2, and CCS3. Each of the latter current sources has a pair of output terminals, such as indicated at 21 and 22 for the current source CCS1. Similarly, the current sources CCS2 and CCS3 have the pairs of output terminals 23 and 24 and 25 and 26, respectively.

The auctioneering circuit 20 comprises means for connecting the output terminals of the respective current sources CCS1, CCS2 and CCS3 in series circuit relation with the output currents of said current sources arranged to flow in the same direction as shown in FIG. 1. More specifically, the output terminal 22 of the current source CCS1 is connected to the output terminal 23 of the current source CCS2 by the electrical conductor 27, while the output terminal 24 of the current source CCS2 is connected to the output terminal 25 of the current source CCS3 by the electrical conductor 28. The series circuit thus formed by the current sources CCS1, CCS2 and CCS3 is connected to a pair of overall output terminals OT1 and OT2 of the auctioneering circuit 20 by the electrical conductors 29 and 31 which are connected between the output terminal 21 of the current source CCS1 and the output terminal OT1 and between the output terminal 26 of the current source CCS3 and the output terminal OT2, respectively. The output terminals OT1 and OT2 may be connected to a load circuit which includes a load 90 for applying to said load circuit an output signal or current which is substantially equal to only the instantaneously largest or greatest of the output currents of the unidirectional current sources CCS1, CCS2 and CCS3.

In order to provide shunt or parallel current paths around at least certain of the current sources CCS1, CCS2 and CCS3 of the auctioneering circuit 20 during certain operating conditions as will be explained hereinafter, the auctioneering circuit 20 includes a plurality of rectifier means which are connected in parallel with the output terminals of the respective current sources CCS1, CCS2 and CCS3. More specifically, the diode RM1 is connected between the output terminals 21 and 22 of the current source CCS1, while the diodes RM2 and RM3 are connected between the output terminals 23 and 24 of the current source CCS2 and between the output terminals 25 and 26 of the current source CCS3, respectively. It is to be noted that all of the diodes RM1, RM2 and RM3 are poled in the same direction which, in the case of each diode, is in a forward direction with respect to the output currents of the current sources associated with the other diodes. For example, the diode RM1 is poled in a forward direction with respect to the output currents $I_2$ and $I_3$ of the current source CCS2 and CCS3, respectively.

In the operation of the current auctioneering circuit 20, it will be assumed that the output current $I_1$ of the current source CCS1 is of a magnitude or value which is instantaneously larger or greater than the magnitude of the output current $I_2$ of the current source CCS2 and that the magnitude of the output current $I_2$ of the current source CCS2 is instantaneously larger or greater than the magnitude of the output current $I_3$ of the current source CCS3. In other words, it will be assumed that the output current $I_1$ is of a magnitude which is instantaneously the largest or greatest of the output currents of the current sources CCS1, CCS2 and CCS3. For purposes of this invention, a substantially constant unidirectional current source is defined as one that delivers substantially a given or predetermined output current independent of the potential difference across its output terminals. In considering the operation of the auctioneering circuit 20 and the other embodiments of the invention which will be described hereinafter, one of Kirchhoff's laws will be employed which states that the sum of the currents directed away from any node of terminal equals the sum of the currents directed toward that node or terminal.

More specifically, if it assumed that the output current $I_1$ of the current source CCS1 is the largest of the output currents of the current sources included in the auctioneering circuit 20, the currents associated with the terminal 23 shown in FIG. 1 will be considered. The currents flowing toward the terminal 23 include the output current $I_1$ of the current source CCS1 and whatever current is flowing through the diode RM1. It has been found that if the output current $I_1$ of the current source CCS1 is the instanteously largest output current of the output currents of the current sources included in the auctioneering circuit 20, the current flow in the diode RM1 is substantially negligible and the current flowing toward the terminal 23 is substantially equal to the output current $I_1$ of the current source CCS1. In accordance with Kirchhoff's law stated above, the sum of the currents flowing away from the terminal 23 is therefore substantially equal to the output current $I_1$ of the current source CCS1. The currents flowing away from the terminal 23 include the output current $I_2$ of the current source CCS2 which is assumed to be less than the output current $I_1$ of the current source CCS1. The balance of the current flowing away from the terminal 23 through the diode RM2 associated with the current source CCS2 is therefore equal to the difference between the output current $I_1$ and the output current $I_2$ or is substantially equal to ($I_1 - I_2$). Considering now the terminal 25 at the left side of the current source CCS3, the total current flowing toward the terminal 25 is equal to the output current $I_2$ of the current source CCS2 and the current flow through the diode RM2 which is equal to ($I_1 - I_2$). The total current flowing toward the terminal 25 is therefore equal to $I_2 + (I_1 - I_2)$ or is substantially equal to the output current $I_1$ of the first current source CCS1. The currents flowing away from the terminal 25 include the output current $I_3$ of the third current source CCS3 and the current flowing away from the terminal 25 through the diode RM3. In accordance with Kirchhoff's law as stated above, the current flowing toward the terminal 25 equals $I_1$ and the current flowing away from the terminal 25 through the diode RM3 is therefore equal to $I_1 - I_3$. Finally, considering the currents associated with the terminal 26 at the other side of the current source CCS3, the total current flowing toward the terminal 26 equals the sum of the output current $I_3$ of the current source CCS3 and the current flowing through the diode RM3, which is equal to the difference between the current $I_1$ and the current $I_3$. The total current flowing toward the terminal 26 is therefore equal to $I_3 + (I_1 - I_3)$ or the current $I_1$, and the output current $I_0$ of the auctioneering circuit 20 which flows away from the terminal 26 is therefore substantially equal to only the output current $I_1$ of the current source CCS1 which was assumed to be the largest or greatest instantaneous output current of the current sources which form part of the auctioneering circuit 20. The net output current of the auctioneering circuit $I_0$ which flows to the output terminals OT1 and OT2 to the load circuit which includes the load 90 and which flows through the series circuit which includes the current sources CCS1, CCS2 and CCS3 is substantially equal to only the output current $I_1$ of the current source CCS1 which was assumed to be the relatively largest or greatest current of the plurality of current sources which are included in the auctioneering circuit 20. If the load 90 were to include only a single resistor connected between the output terminals OT1 and OT2 of the auctioneering circuit 20, a unidirectional voltage would be developed across such an output resistor which would be substantially proportional to the highest output current of the different current sources which form part of the auctioneering circuit 20. In other words, such a unidirectional output voltage across such an output resistor would be substantially proportional to only the instantaneously largest or greatest of the output currents of the different current sources which are included in the current auctioneering circuit 20.

Figure 2:
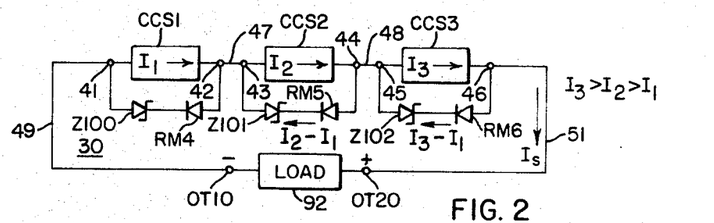
FIG. 2 is a schematic diagram illustrating a second embodiment of the invention.

Referring now to FIG. 2, there is illustrated a second embodiment of the invention in a current auctioneering circuit 30 for obtaining unidirectional output current which is substantially equal to only the instantaneously smallest or lowest of the output currents of a plurality of substantially constant unidirectional or direct current sources CCS1, CCS2 and CCS3. Each of the current sources CCS1, CCS2 and CCS3 of the auctioneering circuit 30 has a pair of output terminals, as indicated at 41 and 42 for the current source CCS1, and as indicated at 43 and 44 and 45 and 46 for the current sources CCS2 and CCS3, respectively. Similarly to the auctioneering circuit 20 previously described, the auctioneering circuit 30 includes means for connecting the output terminals of the respective current sources CCS1, CCS2 and CCS3 in series circuit relation with the output currents of said sources arranged to flow in the same direction, as indicated at $I_1$, $I_2$ and $I_3$, respectively, in FIG. 2. More specifically, the means for connecting the current sources CCS1, CCS2 and CCS3 of the auctioneering circuit 30 in series circuit relation includes the electrical conductor 47 which is connected between the terminals 42 and 43 and the electrical conductor 48 which is connected between the terminals 44 and 45. The series circuit thus formed is connected to a pair of output terminals of the auctioneering circuit 30 as indicated at OT10 and OT20 by the electrical conductors 49 and 51, respectively. A load circuit which includes the load 92 may be connected to the output terminals OT10 and OT20 of the auctioneering circuit 30, as shown in FIG. 2.

In order that the output current of the auctioneering circuit 30 be substantially equal only to the output current of the current source whose magnitude is instantaneously the smallest or lowest compared with the output currents of the other current sources, the auctioneering circuit 30 includes a plurality of rectifier means each of which is connected electrically in parallel with one of the current sources CCS1, CCS2 and CCS3 across the output terminals of the associated current source. More specifically, the diode RM4 is connected between or across the output terminals 41 and 42 of the current source CCS1, while the diodes RM5 and RM6 are connected between or across the output terminals 43 and 44 and 45 and 46 of the current sources CCS2 and CCS3, respectively. It should be noted that all of the diodes RM4, RM5 and RM6 are poled in the same direction and that the diodes RM4, RM5 and RM6 are each reversely poled with respect to the output currents of the current sources which form part of the auctioneering circuit 30 other than the current source to which a particular diode is connected. For example, the diode RM4 is reversely poled with respect to the output currents $I_2$ and $I_3$ of the current sources CCS2 and CCS3, respectively.

Considering the operation of the auctioneering circuit 30, it will be assumed that the output current $I_1$ of the first current source CCS1 is relatively smaller, instantaneously, than the magnitude of the instantaneous output current $I_2$ of the second current source CCS2 and that the instantaneous magnitude of the output current $I_2$ of the second current source CCS2 is relatively smaller than the instantaneous magnitude of the output current $I_3$ of the third current source CCS3. In other words, it will be assumed that the instantaneous magnitude of the output current $I_1$ of the first current source CCS1 is the smallest or lowest of the output currents of the current sources which form part of the current auctioneering circuit 30.

It will also be assumed that the Zener diodes Z100, Z101 and Z102 are omitted, such as in those applications where the maximum voltage developed across the load 92 is less than the sum of the voltage drops across all but one of the diodes RM4, RM5 and RM6. Without the Zener diodes Z100, Z101 and Z102, the auctioneering circuit 30 is limited to applications where the maximum voltage developed across the load 92 is less than the sum of all but one of the forward voltage drops across the diodes RM4, RM5 and RM6. This is because of the voltage developed across the load 92 exceeded the sum of all but one of the forward voltage drops across the diodes RM4, RM5, RM6, the remaining diode would become forward based and the output current of the auctioneering circuit 30 would no longer be substantially equal to only the lowest or smallest of the output currents of the associated sources.

Based upon the assumptions just stated, the operation of the auctioneering circuit 30 may be considered initially in the light of the currents associated with the terminal 42 at the right side of the current source CCS1. The currents flowing toward the terminal 42 include the output current $I_1$ of the current source CCS1. It had been found that if the output current $I_1$ of the current source CCS1 is the smallest or instantaneously lowest of the output currents of the current sources which form part of the auctioneering circuit 30, the current through the diode RM4 associated with the current source CCS1 is substantially negligible. In accordance with Kirchloff's law as previously set forth, the current flowing away from the terminal 42 toward the terminal 43 will therefore be equal to the output current $I_1$. Since it is assumed that the output current $I_2$ of the second current source CCS2 is relatively larger than the output current $I_1$ of the first current source CCS1, the current flowing toward the terminal 43 through the diode RM5 which is associated with said second current source must be substantially equal to the difference between $I_2$ and $I_1$ or be substantially equal to $I_2$ minus $I_1$ in accordance with Kirchhoff's law as previously stated. In other words, a portion of the output current $I_2$ of the second current source CCS2 will flow in a circulating path formed by the associated diode RM5, as just indicated instead of flowing toward the output terminals OT10 and OT20 of the auctioneering circuit 30. Considering the currents associated with the terminal 44 at the right side of the current source CCS2, the current flowing toward the terminal 44 includes the output current $I_2$ of the current source CCS2 while the currents flowing away from the terminal 44 include the current through the diode RM5 which is equal to $I_2 - I_1$, as just explained. The current flowing away from the terminal 44 toward the terminal 45 is therefore equal to $I_2 - (I_2 - I_1)$ or is substantially equal to the current $I_1$. Considering the currents associated with the terminal 45 at the left side of the current source CCS3, the currents flowing toward the terminal 45 include the current $I_1$, as just indicated, while the currents flowing away from the terminal 45 include the output current $I_3$ of the current source CCS3 which is assumed to be relatively larger than the output currents $I_1$ and $I_2$, as previously mentioned. Since the current $I_3$ is relatively larger than the current $I_1$ and since the sum of the currents flowing toward the terminal 45 equals the sum of the currents flowing away from the terminal 45 in accordance with Kirchoff's law, the current flowing toward the terminal 45 through the diode RM6 associated with the current source CCS3 is substantially equal to $I_3 - I_1$. Similarly to the diode e RM5 previously mentioned, the diode RM6 associated with the current source CCS3 forms a circulating current path for a portion of the output current $I_3$ of the current source CCS3. Considering the currents associated with the terminal 46 at the right side of the current source CCS3, the current flowing toward the terminal 46 comprises the output current $I_3$ of the current source CCS3, while the currents flowing away from the terminal 46 include the output $I_S$ of the auctioneering circuit 30 and the current through the diode RM6 which is equal to $I_3 - I_1$ as just explained. Since the currents flowing toward the terminal 46 equal the currents flowing away from the terminal 46 in accordance with Kirchhoff's law, the output current $I_S$ of the auctioneering circuit 30 is equal to $I_3$ minus the quantity $(I_3 - I_1)$ or it is substantially equal to $I_1$ which is the output current of the current source CCS1 which was assumed to be the instantaneously smallest or lowest of the output currents of the current sources which form part of the auctioneering circuit 30. Where it is desired to extend the range of application of the auctioneering circuit 30 to applications where the voltage developed across the load exceeds the sum of the forward voltage drops across all but one of the diodes in a particular application, the Zener diodes Z100, Z101 and Z102 may be provided in series with the respective diodes RM4, RM5 and RM6 with said Zener diodes being oppositely poled with respect to the associated diodes. The auctioneering circuit 30 may then be applied to circuits wherein the voltage developed across the load 92 is less than substantially the sum of the Zener voltages of the Zener diodes.

In summary, the output current, $I_S$, of the auctioneering circuit 30 is substantially equal to the instantaneously smallest of the output currents of the current sources CCS1, CCS2 and CCS3, as just explained, and the output current $I_S$ is available at the output terminal OT10 and OT20 of the auctioneering circuit 30 to be applied to whatever load 92 is connected at said output terminal provided the load voltage does not exceed the forward voltage drop of two diodes in series. If the load 92 comprises an output resistor, the output current of the auctioneering circuit 30 will develop a unidirectional output voltage, which is substantially proportional to the instantaneously smallest output current, across the output resistor which is connected between the output terminals OT10 and OT20, when the above output voltage condition is met.

Figure 3:
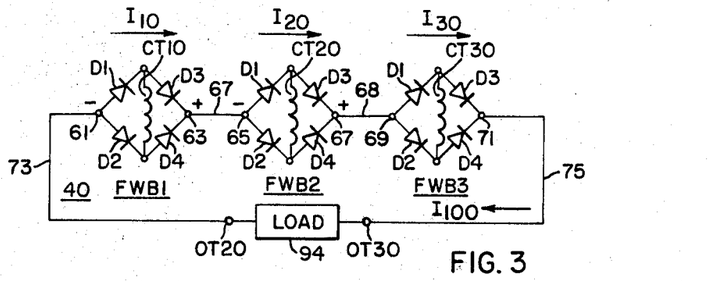
FIG. 3 is a schematic diagram illustrating a third embodiment of the invention.
Figure 5:
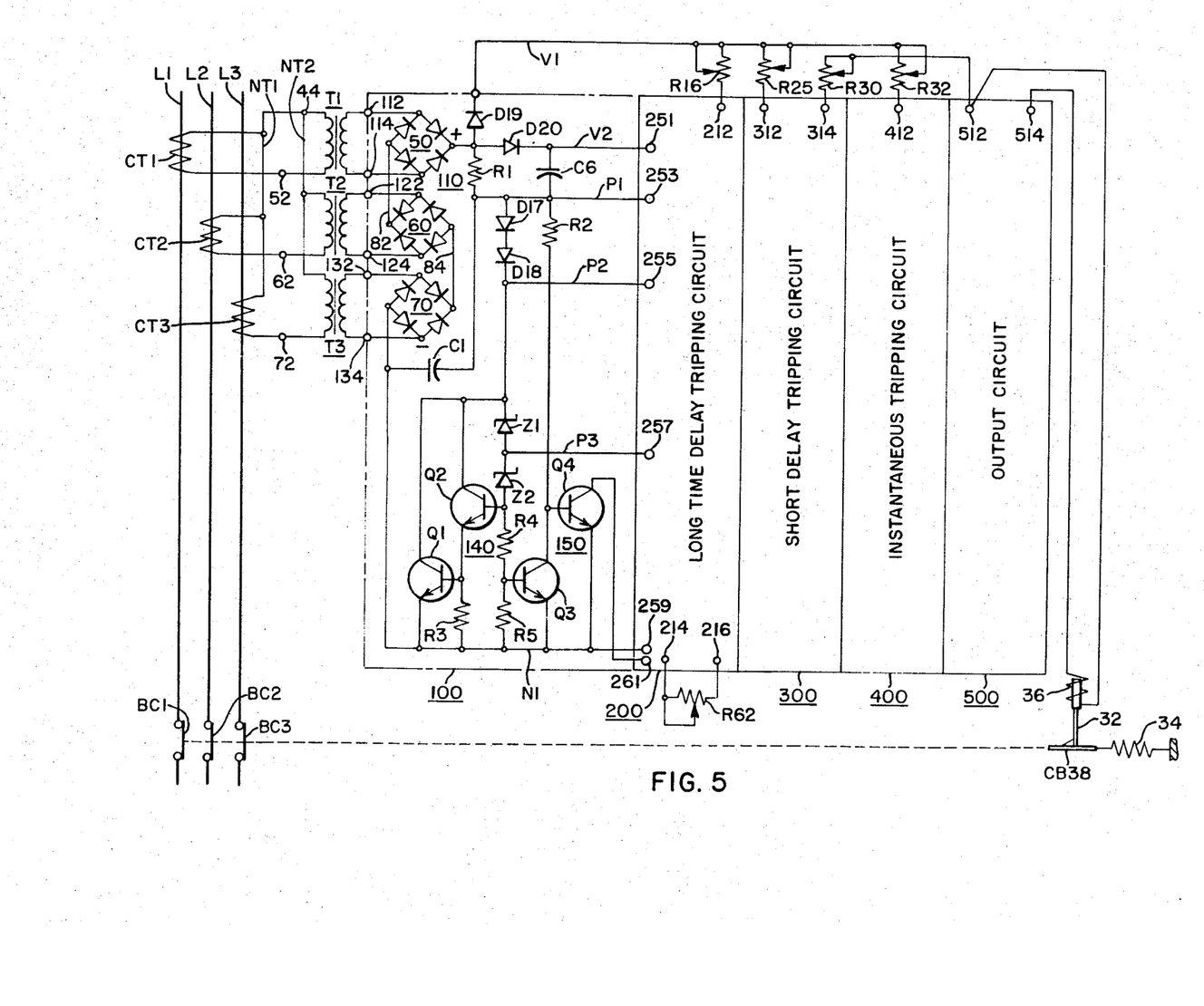
FIG. 5 is a schematic diagram, partly in block form, of an overcurrent protective relay device incorporating the auctioneering circuit of FIG. 3.

Referring now to FIG. 3, there is illustrated a third embodiment of the invention in an auctioneering circuit 40 to obtain a unidirectional output current which is substantially proportional to the output current of only one of a plurality of substantially constant alternating current sources, as indicated by the current transformer windings CT10, CT20 and CT30 which may be disposed in inductive relation with corresponding line conductors of an alternating current circuit, such as shown in FIG. 5, which may be adapted to carry hundreds or thousands of amperes of alternating current in a particular application. The opposite ends of each of the current transformer windings CT10, CT20 and CT30 form a pair of output terminals for each of the alternating current sources which form part of the auctioneering circuit 40.

In order to convert the output current of each of the alternating current sources which form part of the auctioneering circuit 40 to substantially constant unidirectional output currents, a full wave, bridge type rectifier circuit is connected to each of the alternating current sources which form part of the auctioneering circuit 40. More specifically, the full wave bridge rectifier circuit FWB1 which comprises a plurality of diodes D1, D2, D3 and D4 has its alternating current input terminals connected to the first alternating current source, indicated by the current transformer winding 10, as shown in FIG. 3. Similarly the full wave bridge rectifier circuits FWB2 and FWB3 have their input terminals similarly connected to the alternating current sources indicated by the current transformer windings CT20 and CT30, respectively. The alternating output current of the first current source, indicated by the current transformer winding CT10, is therefore converted to a unidirectional output current as indicated by the arrow $I_{10}$ in FIG. 3 which is available at the unidirectional output terminals 61 and 63 of the bridge circuit FWB1. Similarly, the output currents of the second and third alternating current sources indicated by the current transformer windings CT20 and CT30, respectively, are converted to the unidirectional output currents $I_{20}$ and $I_{30}$, respectively, which are available at the unidirectional output terminals 65 and 67 and 69 and 71 of the bridge circuits FWB2 and FWB3, respectively.

The auctioneering circuit 40 also includes means for connecting the unidirectional output terminals of the bridge circuits FWB1, FWB2 and FWB3 in series circuit relation, as indicated by the electrical conductors 67 and 68, with the unidirectional output currents of the associated current sources arranged to flow in the same direction in the series circuit thus formed. The series circuit formed by the bridge circuits just indicated is connected to a pair of overall output terminals OT20 and OT30 of the auctioneering circuit 40 by the electrical conductors 73 and 75, shown in FIG. 3. It is to be noted that during at least certain operating conditions, the diodes of certain of the rectifier bridge circuits FWB1, FWB2 and FWB3 form current carrying paths between the associated unidirectional output terminals of said bridge circuits for a portion of the unidirectional output current of at least one of the other current sources which form part of the auctioneering circuit 40. A load circuit including a load 94 may be connected to the output terminals OT20 and OT30 of the auctioneering circuit 40 to which the output current $I_{100}$ of the auctioneering circuit 40 is applied.

Figure 4:
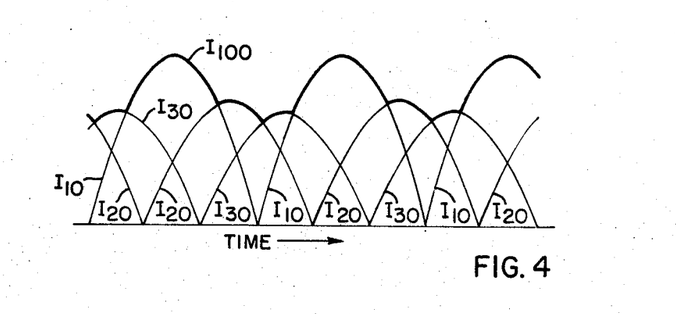
FIG. 4 is a set of wave forms illustrating the operation of the third embodiment of the invention shown in FIG. 3.

Considering the operation of the auctioneering circuit 40, the unidirectional output currents associated with the alternating current sources which form part of the auctioneering circuit 40 are indicated by the waveforms $I_{10}$, $I_{20}$ and $I_{30}$ in FIG. 4 which are representative of the unidirectional, rectified currents associated with the alternating currents of a three-phase alternating current system, such as shown in FIG. 5 of the drawings. In general, the output current $I_{100}$ of the auctioneering circuit 40 which is indicated by the heavy line portion of FIG. 4, is substantially equal to the instantaneously largest unidirectional output current associated with the alternating current sources indicated by the windings CT10, CT20 and CT30. It is to be noted that while the peak value of the unidirectional current output associated with the alternating source indicated by the winding CT10 is assumed to be relatively larger than the peak values of the unidirectional current outputs from the sources indicated by the windings CT20 and CT30, the output current $I_{100}$ of the auctioneering circuit 40 includes heavy line portions which reflect the fact that, instantaneously, portions of the unidirectional output currents associated with the current sources represented by the windings CT20 and CT30 may be relatively larger than the unidirectional output current associated with the first current source indicated by the winding CT10. In other words, the output current $I_{100}$ of the auctioneering circuit 40 which is available at the overall output terminals OT20 and OT30 is substantially equal to only the largest or highest, instantaneous unidirectional output current available from the bridge circuits associated with the first, second and third current sources which form part of the auctioneering circuit 40.

More specifically, if it is assumed that the unidirectional output current available from the output terminals of the bridge circuit FWB1 is instantaneously the largest unidirectional output current compared with the unidirectional output currents available at the output terminals of the other bridge circuits FWB2 and FWB3, the unidirectional output current from the bridge circuit FWB1 will instantaneously flow through only two of the diodes which form part of the bridge circuit FWB1 and the other two diodes will be substantially nonconducting or carry only a negligible current. For example, if it is assumed that the unidirectional output current $I_{10}$ is instantaneously larger than either of the output currents $I_{20}$ or $I_{30}$ associated with the other current sources, and it is assumed that the lower end of the winding CT10 which represents the first alternating current source is instantaneously positive with respect to the upper end of the winding CT10, the diodes D4 and D1 will be forward biased and the diodes D1 and D4 will carry the unidirectional output current $I_{10}$ associated with the alternating current source represented by the winding CT10. The other diodes D2 and D3 of the bridge circuit FWB1 during the assumed operating condition will carry substantially no current as long as the instantaneous operating conditions just described continue. During the assumed operating condition, when the output current $I_{10}$ is relatively larger than the instantaneous output current $I_{20}$ of the second current source, the diodes D1 and D3 of the second bridge circuit FWB2 will form a first forward connected current carrying path between the output terminals 65 and 67 of the second bridge circuit FWB2 and the diodes D2 and D4 of the bridge circuit FWB2 will form a second parallel path between the output terminals 65 and 67 of the second bridge circuit FWB2 to permit the unidirectional output current $I_{10}$ associated with the current source indicated by the winding C10 to flow through the bridge circuit FWB2 to the terminal 69 of the third bridge circuit FWB3. Similarly, during the assumed operating conditions, the diodes D1 and D3 of the third bridge circuit FWB3 will form a current carrying path between the output terminals 69 and 71 of the third bridge circuit FWB3, and the diodes D2 and D4 will form a second parallel current carrying path between the output terminal 69 and 71 to permit the unidirectional output current $I_{10}$ to flow through the third bridge circuit FWB3 to the output terminal 71 and to the output terminal OT30 of the auctioneering circuit 40. In other words, depending upon the particular operating conditions and the instantaneously different magnitudes of the unidirectional output currents associated with the respective current sources which form part of the auctioneering circuit 40, the diodes of the bridge circuits FWB1, FWB2 and FWB3 will at different times assist in converting the alternating current on the associated alternating current sources to unidirectional currents and at other times will provide current carrying paths for at least a portion of the unidirectional output current from the bridge circuit associated with one of the other current sources.

Referring now to FIG. 5, there is illustrated an overcurrent protective relay device which incorporates a current auctioneering circuit of the type disclosed particularly in FIG. 3 of the drawings and which is described in greater detail in copending application Ser. No. 35,531 previously mentioned. The overcurrent protective device shown in FIG. 5 is associated with the line conductors L1, L2 and L3 of a three-phase alternating current system and is typically designed for operation at a frequency of 60 cycles per second.

A circuit breaker CB is provided for segregating or isolating portions of the electrical system under certain abnormal conditions, such as an overcurrent condition. The circuit breaker CB includes a plurality of separable line contacts BC1, BC2 and BC3 which are closed when the circuit breaker is closed and which are open when the circuit breaker is open. The circuit breaker CB also includes a trip coil 36 which when energized while the circuit breaker is closed results in a tripping or opening operation of the circuit breaker CB. As illustrated diagrammatically in FIG. 5, energization of the trip coil 36 may actuate an operating member 32 to release a latch member 38 to thereby actuate an opening operation of the line contacts BC1, BC2 and BC3 under the influence of a suitable operating means, such as the opening spring 34, which may be operatively connected to said line contacts.

In general, the protective device shown in FIG. 5 is arranged to respond to the highest or largest of the line currents which flow in the conductors L1, L2 and L3 to energize the trip coil 36 and to actuate the tripping of the circuit breaker CB after a time delay which is initiated when the largest or highest of the line currents in said conductors exceeds a predetermined value and which varies substantially inversely with the square of the highest of the line currents in said conductors for a predetermined range of overcurrents in said conductors. This result is accomplished by the operation of a long time delay tripping circuit 200 as shown in FIG. 5 which actuates the operation of an output circuit 500 which, in turn, energizes the trip coil 36 as just mentioned. Where desired, the protective device shown in FIG. 5 may also include an instantaneous tripping circuit 400 which responds to the highest or largest of the line currents in the line conductors L1, L2 and L3 to actuate the output circuit 500 to energize the trip coil 36 and to actuate the tripping of the circuit breaker CB in a substantially instantaneous manner without any intentional time delay when the highest of the line currents in said conductors exceeds a predetermined value. In addition, the protective device shown in FIG. 5 may also include a short delay tripping circuit 300 which responds to a certain range of overcurrents to actuate the output circuit to energize the trip coil 36 to trip the circuit breaker CB after a substantially fixed or predetermined time delay when the highest of the line currents in the conductors L1, L2 and L3 exceeds a predetermined value.

In order to obtain a plurality of output alternating currents which are directly proportional to the line currents in the conductors L1, L2 and L3, a plurality of current transformers CT1, CT2 and CT3 are provided, as shown in FIG. 5, with the primary windings of said current transformers being energized in accordance with the line currents in said conductors. The windings of the current transformers CT1, CT2 and CT3 are wye connected between the neutral terminal NT1 and the respective output terminals 52, 62 and 72, as illustrated. In order to further step down the output currents of the current transformers CT1, CT2 and CT3, the intermediate transformers T1, T2 and T3, which may be the saturating type, are connected between the windings of said current transformers and the input terminals of the power supply input circuit 100 of the protective device shown in FIG. 5. More specifically, the primary windings of the transformers T1, T2 and T3 are wye connected between the output terminals 52, 62 and 72, respectively, of the current transformers CT1, CT2 and CT3, respectively, and the neutral terminal NT2 with the neutral terminal NT2 being connected to the neutral terminal NT1 of said current transformers through the terminal 44 of the primary winding of the transformer T1. The secondary windings of the transformers T1, T2 and T3 are connected to the input terminals 112 and 114, 122 and 124 and 132 and 134, respectively, of the power supply input circuit 100 of the protective device shown in FIG. 5 to provide three output currents which, in turn, are directly proportional to the line currents in the conductors L1, L2 and L3. The line conductors L1, L2 and L3 in cooperation with the current transformers CT1, CT2 and CT3 and the intermediate transformers T1, T2 and T3 provide a plurality of substantially constant alternating currents which are applied to the current auctioneering circuit 110 which is of the same type previously described in detail in connection with the auctioneering circuit 40 shown in FIG. 3.

More specifically, the current auctioneering circuit 110 includes a plurality of full wave bridge type rectifier circuits 50, 60 and 70 which correspond to the bridge rectifier circuits FWB1, FWB2, FWB3, respectively, in FIG. 3. The unidirectional output terminals of the bridge circuits 50, 60 and 70 are connected in series circuit relation by the electrical conductors 82 and 84, as shown in FIG. 5, with the positive output terminal of the bridge circuit 50 forming one of the overall output terminals of the current auctioneering circuit 110 and the negative output terminal of the bridge circuit 70 forming the other overall output terminal of the current auctioneering circuit 110. The unidirectional output current of the current auctioneering circuit 110 which is substantially proportional to only the highest or largest of the line currents of the conductors L1, L2 and L3 is applied to an output resistor R1, as shown in FIG. 5, to develop a unidirectional voltage which is substantially proportional to only the highest or largest of the currents flowing in the line conductors L1, L2 and L3. As previously explained in connection with FIG. 3, the diodes which form part of the bridge circuits 50, 60 and 70 serve to both convert the alternating current inputs to the current auctioneering circuit to unidirectional output currents and to form current carrying paths for the unidirectional output current of one of the bridge circuits during at least certain operating conditions, as explained in detail in connection with FIG. 3. It is to be noted that one end of the resistor R1 is connected to the positive output terminal of the bridge circuit 50, while the lower end of the resistor R1 is connected to the conductor P1. One or more filter capacitors, as indicated at C1 in FIG. 5, is connected between the conductor P1 and the negative output terminal of the bridge circuit 70 which is also electrically connected to a common conductor, as indicated at N1 in FIG. 5.

In order to provide a plurality of regulated, filtered unidirectional voltages for the balance of the protective device shown in FIG. 5, a series circuit is electrically connected in parallel with the capacitor C1 between the conductor P1 and the common conductor N1 which includes the forward connected diodes D17 and D18 and a shunt voltage regulator 140 which includes the Zener diodes Z1 and Z2 and the current amplifying transistors Q1 and Q2. As explained in detail in the copending application Ser. No. 35,531 previously mentioned, the regulated potentials provided by the power supply input circuit 100 are available at the positive conductors P1, P2 and P3.

In order to prevent the operation of the output circuit 500 in the absence of the regulated potentials at the conductors just mentioned, the control means 150 may be connected in circuit relation with the shunt voltage regulator 140 and comprises the transistors Q3 and Q4 and the voltage dividing network which includes the resistors R4 and R5. In the operation of the control means 150, as explained in detail in copending application Ser. No. 35,531 previously mentioned, the transistor Q3 is actuated to a substantially saturated condition unless the regulated potentials at the conductors P1, P2 and P3 are adequate to insure the energization of the trip coil 36 upon the actuation of the output circuit 500. In order to obtain an input unidirectional voltage for the various tripping circuits of the protective device shown in FIG. 5, the diode D19 may be connected to the upper end of the output resistor R1 which develops a unidirectional voltage from the unidirectional output current of the auctioneering circuit 110 which is available at the variable voltage bus conductor V1 shown in FIG. 5. For other portions of the protective device shown in FIG. 5, a filtered unidirectional voltage may be obtained by connecting the diode D20 to the upper end of the resistor R1 and a filter capacitor C6 connected between the conductor P1 and the cathode of the diode D20 which, in turn, is connected to the variable voltage bus conductor V2. The balance of the operation of the protective device shown in FIG. 5 is explained in detail in copending application Ser. No. 35,531 previously mentioned.

The auctioneering circuits disclosed embodying the teachings of this invention have several advantages. For example, a plurality of unidirectional output currents may be compared directly without converting each of the unidirectional currents to a unidirectional output voltage, as required in auctioneering circuits which operate on a voltage basis. The loss of accuracy due to the differences in the values of the resistors across which the different unidirectional voltages are developed is therefore eliminated to improve the accuracy of the overall auctioneering circuit. In addition, the power losses resulting from applying the individual unidirectional currents to the associated resistors are also eliminated A further advantage of the disclosed invention is that a relatively large number of unidirectional currents may be conveniently compared in an auctioneering circuit to obtain an output current which is substantially equal to or proportional to only the highest or the lowest of the input currents without requiring different control stages to accomplish the desired result.

It is to be understood that in certain applications an additional rectifier means or diode may be connected in parallel with the unidirectional output terminals of each of the bridge rectifier circuits FWB1, FWB2, and FWB3 shown in FIG. 3 to provide a separate current carrying path in parallel with each of the bridge circuits which form part of the auctioneering circuits 40.

We claim:

1. An auctioneering circuit for obtaining a unidirectional output current which is substantially equal to the output current of only one of a plurality of substantially constant, unidirectional current sources each having a pair of output terminals comprising means for connecting the output terminals of the respective current sources in series circuit relation with the substantially constant unidirectional output currents of said sources arranged to flow in the same direction, said series circuit being connected to a pair of overall output terminals, and rectifier means connected in parallel with the output terminals of each of said current sources, all of said rectifier means being poled in the same direction, the rectifier means associated with each current source being reversely poled with respect to the direction of the output currents of the other current sources, the output current of said auctioneering circuit being substantially equal to only the smallest of the output currents of said current sources.

2. The combination as claimed in claim 1 wherein each rectifier means comprises a diode.

3. The combination as claimed in claim 2 wherein an additional Zener diode is connected in series with each diode and oppositely poled with respect to the associated diode.

4. A three-phase circuit breaker comprising three sets of separable contacts, operating means for opening and closing said sets of contacts, a plurality of current transformers for obtaining three substantially constant alternating output currents which are substantially proportional to the currents in said sets of contacts, three intermediate transformers of the saturating type connected to said current transformers for further stepping down the output currents of said current transformers to a plurality of intermediate, substantially constant alternating output currents, three full wave, bridge rectifier circuits connected respectively to said three intermediate transformers for converting said intermediate, substantially constant alternating output currents to corresponding unidirectional output currents, each of said rectifier circuits comprising a plurality of diodes and a pair of unidirectional current output terminals, means for connecting the output terminals of said bridge circuits in series circuit relation between a pair of overall output terminals with the unidirectional output currents arranged to flow in the same direction whereby the unidirectional output current at said overall output terminals is substantially equal to only the instantaneously highest of the unidirectional output currents of said bridge circuits said diodes of each bridge rectifier circuit associated with one of said alternating output currents during at least certain operating conditions forming a current carrying path between the unidirectional output terminals of the last-mentioned bridge circuit, and means responsive to the output current at said overall output terminals which is substantially equal to only the instantaneously highest of the unidirectional output currents of said bridge circuits for actuating said operating means to open said contacts.

5. The combination as claimed in claim 4 wherein each bridge rectifier circuit comprises four diodes connected between said current transformers and the unidirectional output terminals of said bridge rectifier circuit.

6. The combination as claimed in claim 4 wherein a resistor is connected to said pair of overall output terminals for developing thereacross a unidirectional output voltage which varies with only the highest output current of said current transformers.

* * * * *